UNITED STATES PATENT OFFICE.

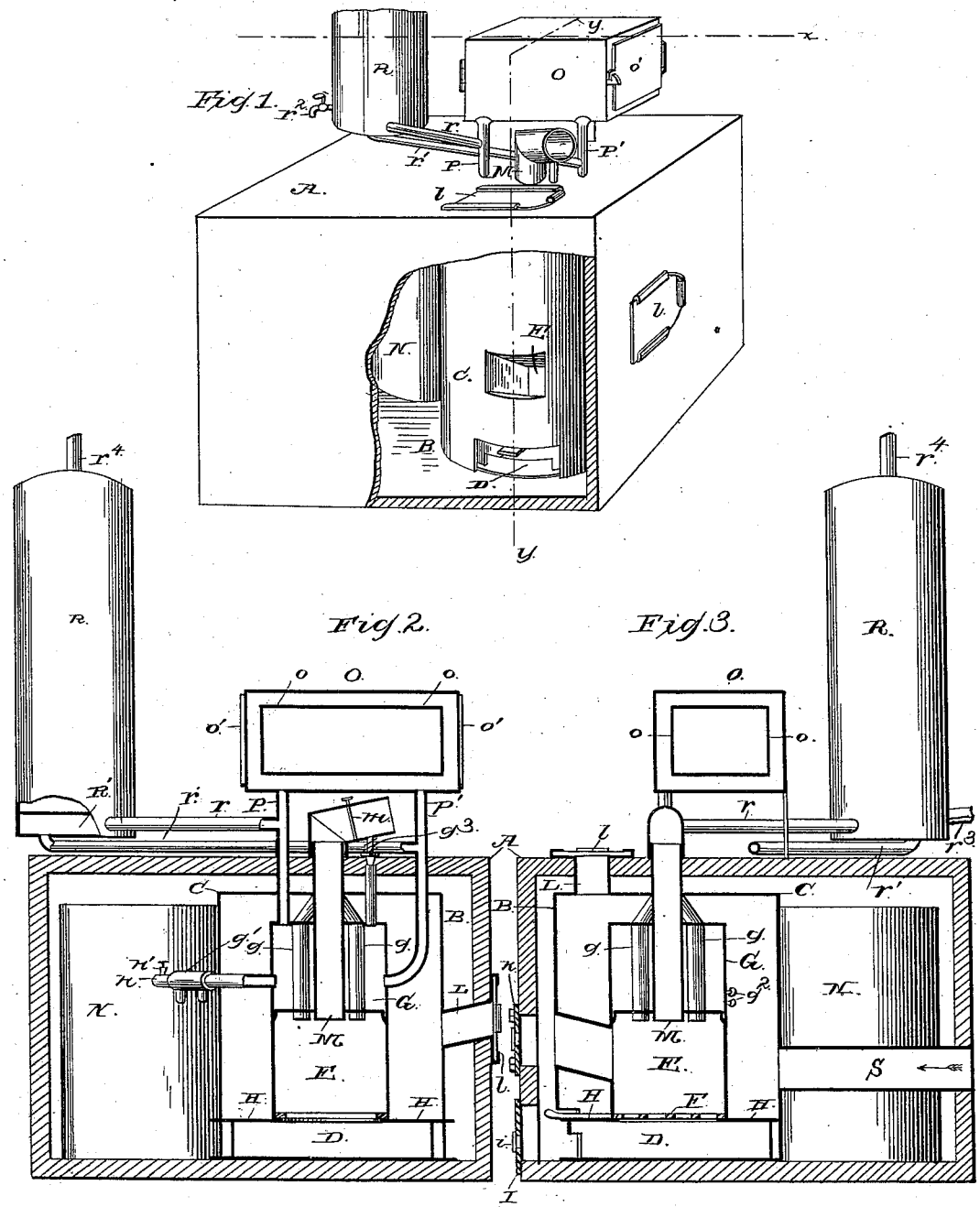

WILLIAM H. DENSLOW, OF TROY, PENNSYLVANIA, ASSIGNOR OF ONE-HALF TO JOSEPH JORALEMON, OF SAME PLACE.

HEATER.

SPECIFICATION forming part of Letters Patent No. 334,695, dated January 19, 1886.

Application filed March 20, 1885. Serial No. 159,594. (No model.)

*To all whom it may concern:*

Be it known that I, WILLIAM H. DENSLOW, a citizen of the United States, residing at Troy, in the county of Bradford and State of Pennsylvania, have invented a new and useful Improvement in Heaters, of which the following is a specification, reference being had to the accompanying drawings.

My invention relates to an improvement in combined steam and hot-air heaters; and it consists in the peculiar construction and arrangement of devices, that will be more fully set forth hereinafter, and particularly pointed out in the claims.

In the accompanying drawings, Figure 1 is a perspective view of a heater embodying my invention, portions of the outer casing being broken away so as to disclose interior parts. Fig. 2 is a vertical sectional view of the same, taken on the line $x\,x$ of Fig. 1. Fig. 3 is a vertical sectional view taken on the line $y\,y$ of Fig. 1.

A represents an outside casing, which may be of any preferred shape. In this casing is located a heater, B, which consists of the casing C, ash-chamber D, combustion-chamber E, grate F, and steam-boiler G, which is located on top of the combustion-chamber. The sides of the casing C are some distance from the sides of the combustion-chamber and boiler, so as to leave a space for the circulation of hot air. The ash-chamber extends entirely across the lower end of the casing C, and has a top plate, H, which divides it from the air-space between the sides of the combustion-chamber and boiler and the casing C. The casing C is made of any suitable metal, and is covered with asbestus or other non-conducting material, so as not to radiate heat, and thus avoid heating and injuring the outer casing, A. A door, I, in the casing A, having dampers $i$, communicates with an opening in the ash-chamber, and a door, K, in the casing A, communicates with the combustion-chamber. Pipes L lead from the inner casing through the outer casing, and are provided at their outer ends with registers $l$. Vertical flues $g$ pass through the boiler and lead to a smoke-pipe, M, in which is a damper, $m$. The boiler is provided with the usual inspirator, $g'$, try-cocks $g^2$, and safety-valve $g^3$. A water-tank, N, is here shown as located in the casing A, and has a pipe, $n$, for supplying water to the boiler. The water-tank may be, if preferred, located outside of the casing A, or, in cities, entirely discarded, and the pipe $n$ connected to the water-pipe in the house. A cock, $n'$, is located in the pipe $n$.

O represents an oven, which is constructed with double walls $o$ and has the door $o'$. This oven is supported above the casing A, and is connected to the boiler by pipes P P'.

R represents a hot-water tank, which has a steam-chamber, R', at its lower end, which steam-chamber is connected to the pipe P by a pipe, $r$, and to the pipe P' by a pipe, $r'$. A cock, $r^2$, is attached to the hot-water tank, and to the said tank are attached a supply-pipe, $r^3$, for conveying cold water to the tank, and a delivery-pipe, $r^4$, for conveying water from the tank after it has become heated.

The operation of my invention is as follows: The fire is made in the combustion-chamber, which heats the air in the space surrounding said chamber, and this heated air is admitted to the room through the registers $l$. A pipe, S, supplies fresh air. Steam is generated in the boiler and passes through the pipe P to the oven, circulates between the double walls of the oven, and returns to the boiler through the pipe P'. From the pipe P a portion of the steam passes through the pipe $r$ to the chamber under the hot-water tank and heats the water in said tank. From this steam-chamber the steam passes through the pipe $r'$ to the pipe P', and from thence back into the boiler. In addition to cooking the articles therein, the oven radiates heat, which assists in heating the room.

Having thus described my invention, I claim—

1. The combined heater and boiler comprising the outer casing, C, the combustion-chamber E, and steam-boiler G, formed together and of like diameter, the boiler being above the combustion-chamber, and the said boiler and combustion-chamber being of smaller diameter than the outer casing, whereby an air-space is left surrounding them, pipes for supplying air to this space to be heated, and pipes for conveying the heated air therefrom, the smoke-pipe M, leading from the combustion-chamber up through the center of the boiler, and the flues $g$ in the boiler, arranged around the smoke-pipe and communicating therewith at their upper ends, below the top of the outer casing, substantially as described.

2. The combination, with the casing A, of the steam-boiler and air-heater inclosed in the casing, and the oven having double walls, located above and outside the casing, and the pipes P and P', connecting the oven with the boiler, to circulate steam around the oven and support the same, substantially as described.

In testimony that I claim the foregoing as my own I have hereto affixed my signature in presence of two witnesses.

WILLIAM H. DENSLOW.

Witnesses:
J. Q. ADAMS,
B. MURRAY.